(12) United States Patent
ReMine et al.

(10) Patent No.: US 11,288,414 B2
(45) Date of Patent: Mar. 29, 2022

(54) ARTIFICIAL INTELLIGENCE-BASED MANUFACTURING PART DESIGN

(71) Applicant: The Boeing Company, Chicago, IL (US)

(72) Inventors: Daniel S. ReMine, Seattle, WA (US); Kevin Vasko, Huntsville, AL (US); Alan R. Katz, Bellevue, WA (US); Craig S. Bosma, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 800 days.

(21) Appl. No.: 16/197,149

(22) Filed: Nov. 20, 2018

(65) Prior Publication Data

US 2020/0159886 A1    May 21, 2020

(51) Int. Cl.
*G06F 30/13* (2020.01)
*G06F 30/15* (2020.01)
(Continued)

(52) U.S. Cl.
CPC .............. *G06F 30/15* (2020.01); *G06F 30/13* (2020.01); *G06F 30/27* (2020.01); *G06N 3/088* (2013.01);
(Continued)

(58) Field of Classification Search
CPC .......... G06F 30/15; G06F 30/13; G06F 30/27; G06F 2119/18; G06F 16/958; G06N 3/088; G06N 20/00; G06N 3/0454; G06T 17/00; G06T 19/00; G06T 17/30; B23P 19/041; B25J 13/088; B66C 23/20; H04N 19/42; H04R 1/1016; Y02E 70/30
See application file for complete search history.

(56) References Cited

FOREIGN PATENT DOCUMENTS

| CN | 1812868 B | * | 9/2010 | ............ B25J 13/088 |
| CN | 102867083 A | * | 1/2013 | |

(Continued)

OTHER PUBLICATIONS

Nobuyuki Umetani, "Exploring generative 3D shapes using autoencoder networks", SIGGRAPH Asia 2017 Technical Briefs on, SA '17, Nov. 1, 2017 (Nov. 1, 2017), pp. 1-4, New York, New York, USA.
(Continued)

*Primary Examiner* — Kandasamy Thangavelu
(74) *Attorney, Agent, or Firm* — Haynes and Boone, LLP

(57) ABSTRACT

Systems, methods, and apparatus for artificial intelligence-based manufacturing part design are disclosed. A system for designing a part comprises at least one processor configured: to encode the desired part design to generate an encoded desired part design; to identify a group of part designs within a space that is similar to the desired part design by comparing the encoded desired part design to encoded realized part designs, encoded imagined part designs, real metadata, and imagined metadata within the space; to generate an encoded optimal part design by analyzing the group of part designs according to objectives and weightings provided by a user; and to decode the encoded optimal part design to generate an optimal part design. Further, the system comprises a display configured to display, to the user, the optimal part design, which the user may use as a guide to modify the desired part design accordingly.

20 Claims, 14 Drawing Sheets

(51) Int. Cl.
*G06N 20/00* (2019.01)
*G06N 3/08* (2006.01)
*G06T 17/00* (2006.01)
*G06F 30/27* (2020.01)
*G06F 119/18* (2020.01)

(52) U.S. Cl.
CPC ............ *G06N 20/00* (2019.01); *G06T 17/00* (2013.01); *G06F 2119/18* (2020.01)

(56) References Cited

FOREIGN PATENT DOCUMENTS

| CN | 104796806 A | * | 7/2015 | ........... H04R 1/1016 |
| EP | 2442279 A1 | * | 4/2012 | ............. G06T 17/30 |
| WO | WO 0078499 A1 | * | 12/2000 | ............ B23P 19/041 |

OTHER PUBLICATIONS

Marino J et al: "Structural design, analysis, optimization, and cost modeling using the adaptive modeling language", Collection of Technical Papers—Aiaa/Asme/Asce/Ahs/Asc Structures, Structural Dynamics and Materials Conference 2002 American Inst. Aeronautics and Astronautics Inc. US, vol. 2, 2002, pp. 755-762.

Vico F J et al: "Automatic design synthesis with artificial intelligence techniques", Artificial Intelligence in Engineering Elsevier UK, vol. 13, No. 3, Jul. 1999 (Jul. 1999), pp. 251-256.

Nash C et al: "The shape variational autoencoder: A deep generative model of part-segmented 3D objects", Computer Graphics Forum Wiley USA, vol. 36, No. 5, Aug. 2017, pp. 1-12.

Zhoutun Zhu et al.; "Deep Learning Representation Using Autoencoder for 3D Shape Retrieval"; Department of Electronics and Information Engineering, Huazhong University of Science and Technology, PR China; 6 pages.

* cited by examiner

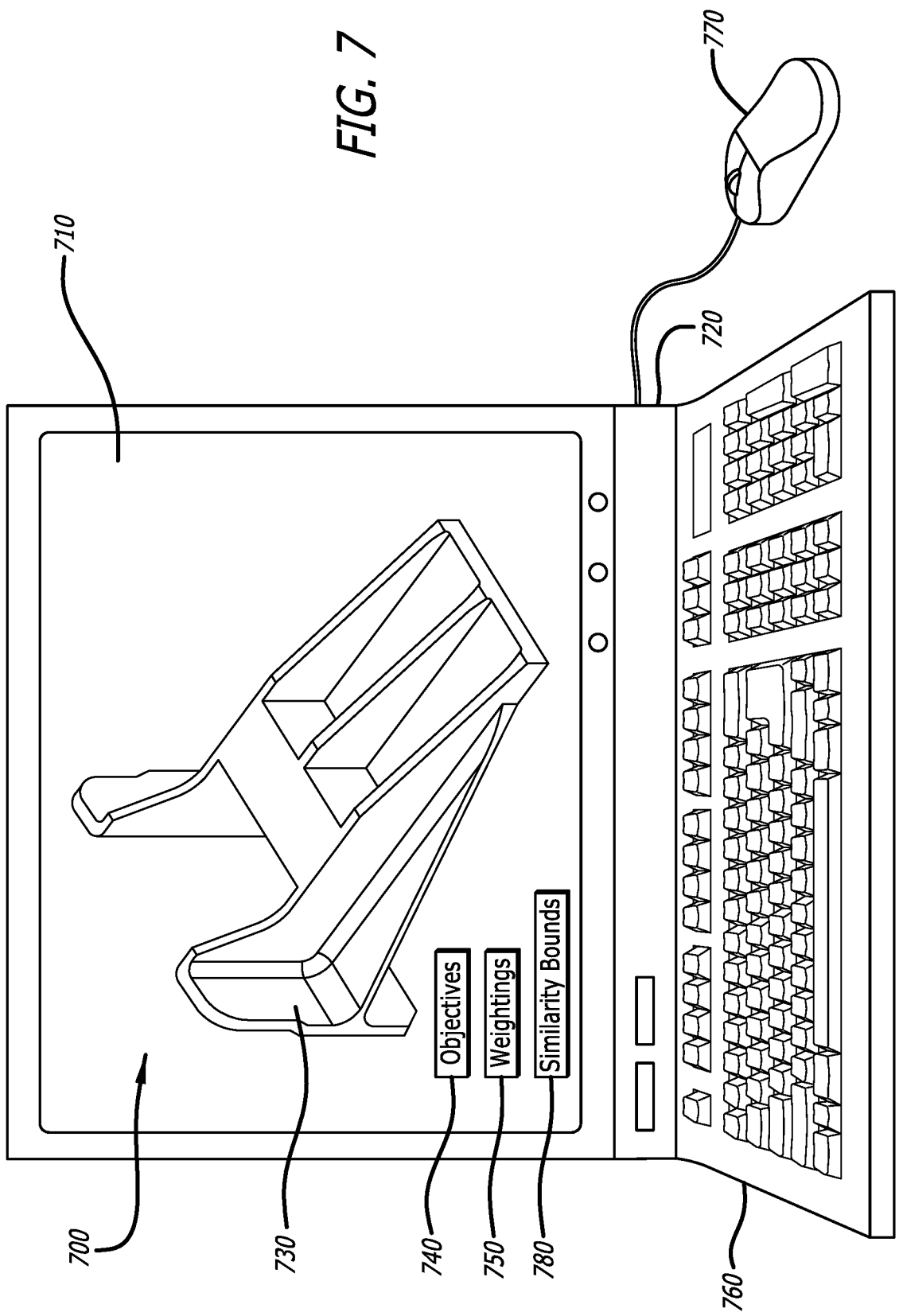

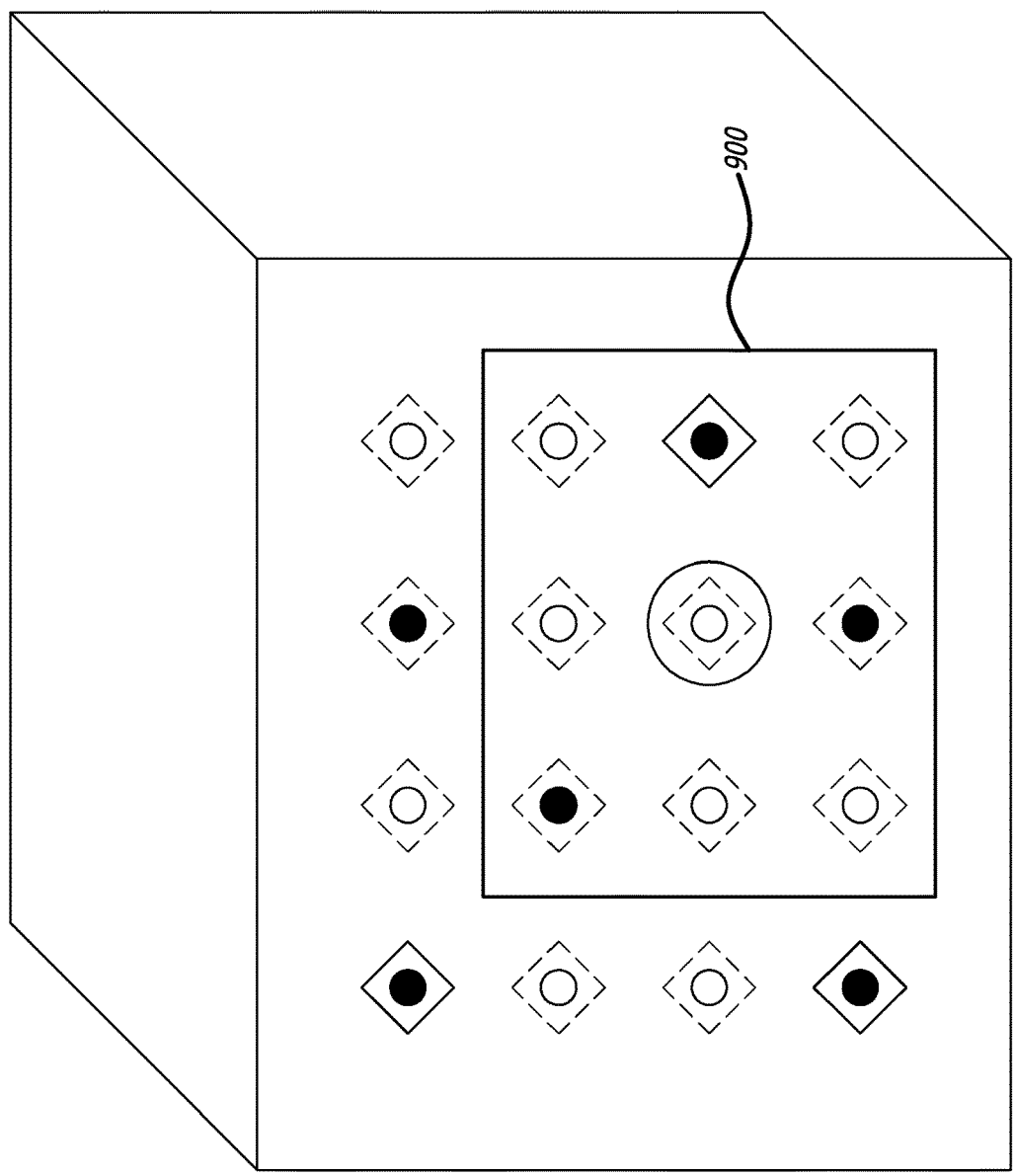
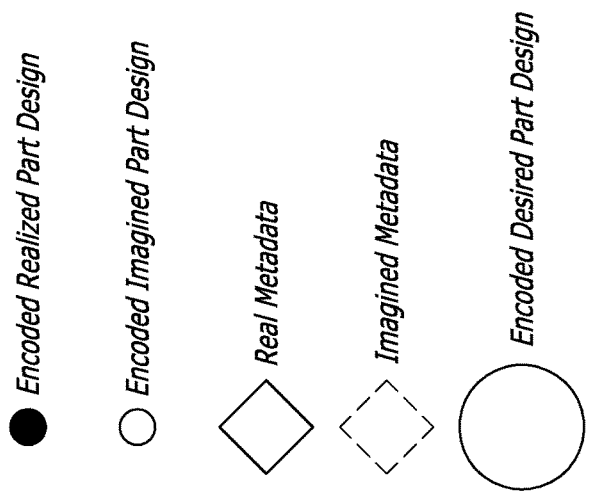
FIG. 9

ARTIFICIAL INTELLIGENCE-BASED MANUFACTURING PART DESIGN

FIELD

The present disclosure relates to part design. In particular, the present disclosure relates to artificial intelligence-based manufacturing part design.

BACKGROUND

Currently, the engineering design of parts requires a design engineer to iteratively, manually generate and analyze multiple designs for a part in order to achieve a final part design with the desired characteristics for that part. Even then, the final part design has not been specifically optimized for cost, manufacturability, and/or quality. Since this design process requires iteratively designing and analyzing multiple designs for a single part to achieve the desired part design, this process is tedious and slow for the design engineer. However, some design programs do allow for the design engineer to enter parametric rules into the geometric design for the part manually. But, this process is very labor intensive, technically advanced, slow, costly, and requires highly specialized skills. As such, the current conventional engineering design of parts is slow, manual, and suboptimal in cost, manufacturability, and quality.

In light of the foregoing, there is a need for an improved technology for the design of parts.

SUMMARY

The present disclosure relates to a method, system, and apparatus for artificial intelligence-based manufacturing part design. In one or more embodiments, a method for designing a part comprises inputting, by a user into a user interface, a desired part design, objectives for the desired part design, weightings for the objectives, and similarity bounds. The method further comprises encoding, by at least one processor, the desired part design to generate an encoded desired part design. Also, the method comprises identifying, by at least one processor, a group of part designs within a space, based on the similarity bounds, that is similar to the desired part design by comparing the encoded desired part design to encoded realized part designs, encoded imagined part designs, real metadata, and imagined metadata within the space. In addition, the method comprises generating, by at least one processor, an encoded optimal part design by analyzing the group of part designs according to the objectives and the weightings. Additionally, the method comprises decoding, by at least one processor, the encoded optimal part design to generate an optimal part design. Further, the method comprises displaying, on a display, the optimal part design.

In one or more embodiments, the method further comprises revising, by the user, the desired part design according to the optimal part design to generate a final part design. In at least one embodiment, the method further comprises manufacturing, by machinery, the part by using the final part design. In one or more embodiments, the method further comprises installing the part onto a unit. In at least one embodiment, the unit is a vehicle, a structure, or a device.

In at least one embodiment, the method further comprises inputting realized part designs for parts that have part designs. Also, the method comprises encoding, by at least one processor, the realized part designs to generate the encoded realized part designs. In addition, the method comprises inputting, into the space, the encoded realized part designs. Additionally, the method comprises generating, by at least one processor, the encoded imagined part designs for the space by using the encoded realized part designs in the space. In addition, the method comprises inputting, into the space, the real metadata for at least some of the encoded realized part designs. Further, the method comprises generating, by at least one processor, the imagined metadata for the encoded imagined part designs and/or the encoded realized part designs that do not have real metadata by using the real metadata in the space.

In one or more embodiments, at least one processor uses a machine learning algorithm to generate the encoded imagined part designs. In at least one embodiment, the machine learning algorithm is an autoencoder. In one or more embodiments, at least one processor uses regression and classification models or non-statistical algorithms to generate the imagined metadata.

In at least one embodiment, the objectives for the desired part design are cost, structural integrity, manufacturability, and/or weight. In one or more embodiments, the desired part design is a computer aided design (CAD) model design. In at least one embodiment, the optimal part design is a CAD model design.

In one or more embodiments, a system for designing a part comprises a user interface to receive, from a user, a desired part design, objectives for the desired part design, weightings for the objectives, and similarity bounds. The system further comprises memory to store a space comprising an encoded desired part design, encoded realized part designs, encoded imagined part designs, real metadata, and imagined metadata. Also, the system comprises at least one processor configured: to encode the desired part design to generate the encoded desired part design; to identify a group of part designs within the space, based on the similarity bounds, that is similar to the desired part design by comparing the encoded desired part design to the encoded realized part designs; the encoded imagined part designs, the real metadata, and the imagined metadata within the space; to generate an encoded optimal part design by analyzing the group of part designs according to the objectives and the weightings; and to decode the encoded optimal part design to generate an optimal part design. Further, the system comprises a display configured to display, to the user, the optimal part design.

In at least one embodiment, the user interface is further to allow the user to revise the desired part design according to the optimal part design to generate a final part design. In one or more embodiments, the system further comprises machinery to manufacture the part by using the final part design. In at least one embodiment, the part is configured to be installed onto a unit. In one or more embodiments, the unit is a vehicle, a structure, or a device.

In one or more embodiments, at least one processor is further configured: to encode realized part designs to generate the encoded realized part designs for the space, to generate the encoded imagined part designs for the space by using the encoded realized part designs in the space, and to generate the imagined metadata for the encoded imagined part designs and/or for the encoded realized part designs that do not have the real metadata by using the real metadata for at least some of the encoded realized part designs in the space.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

Figure 6A:
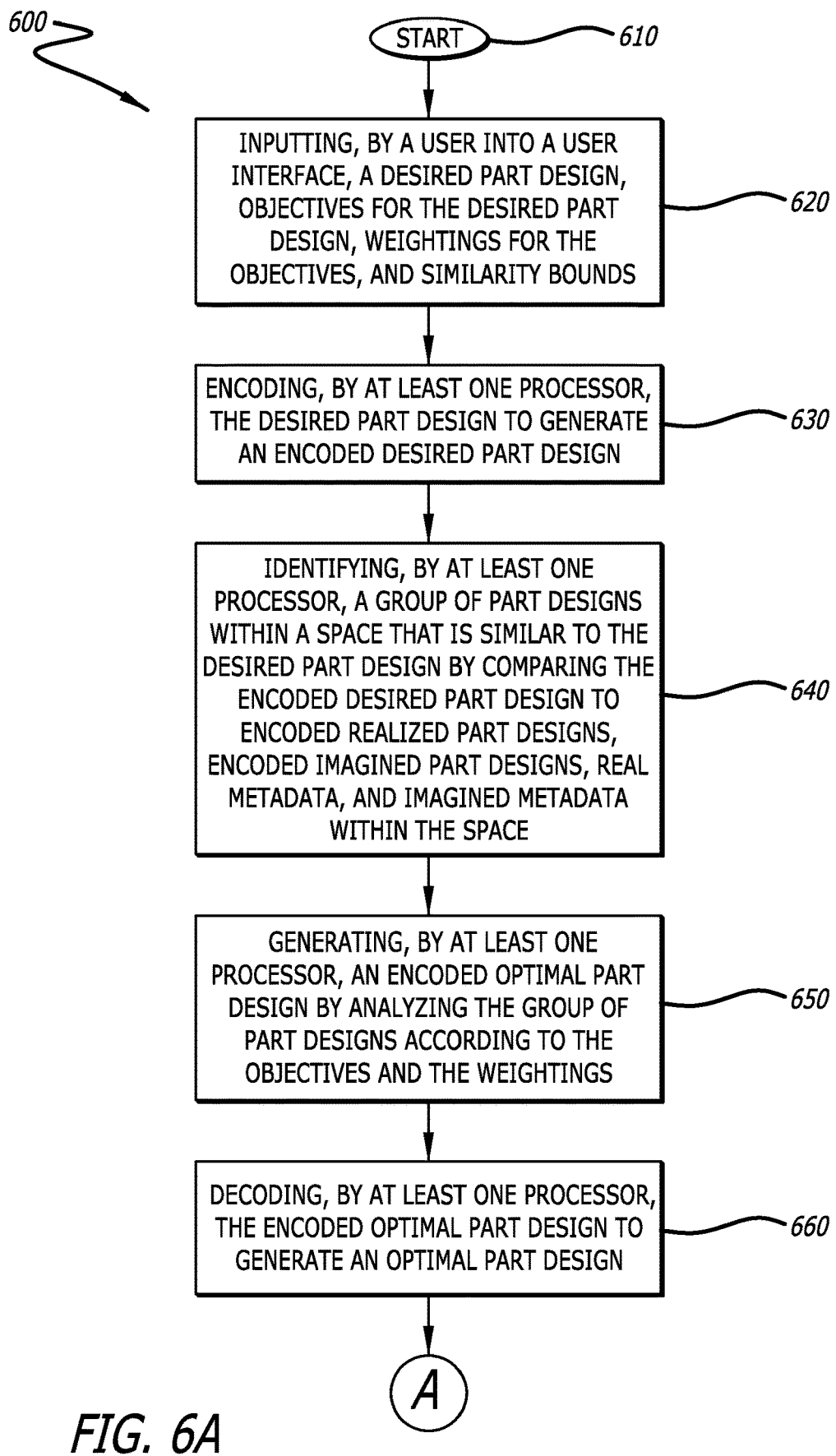
Figure 6B:
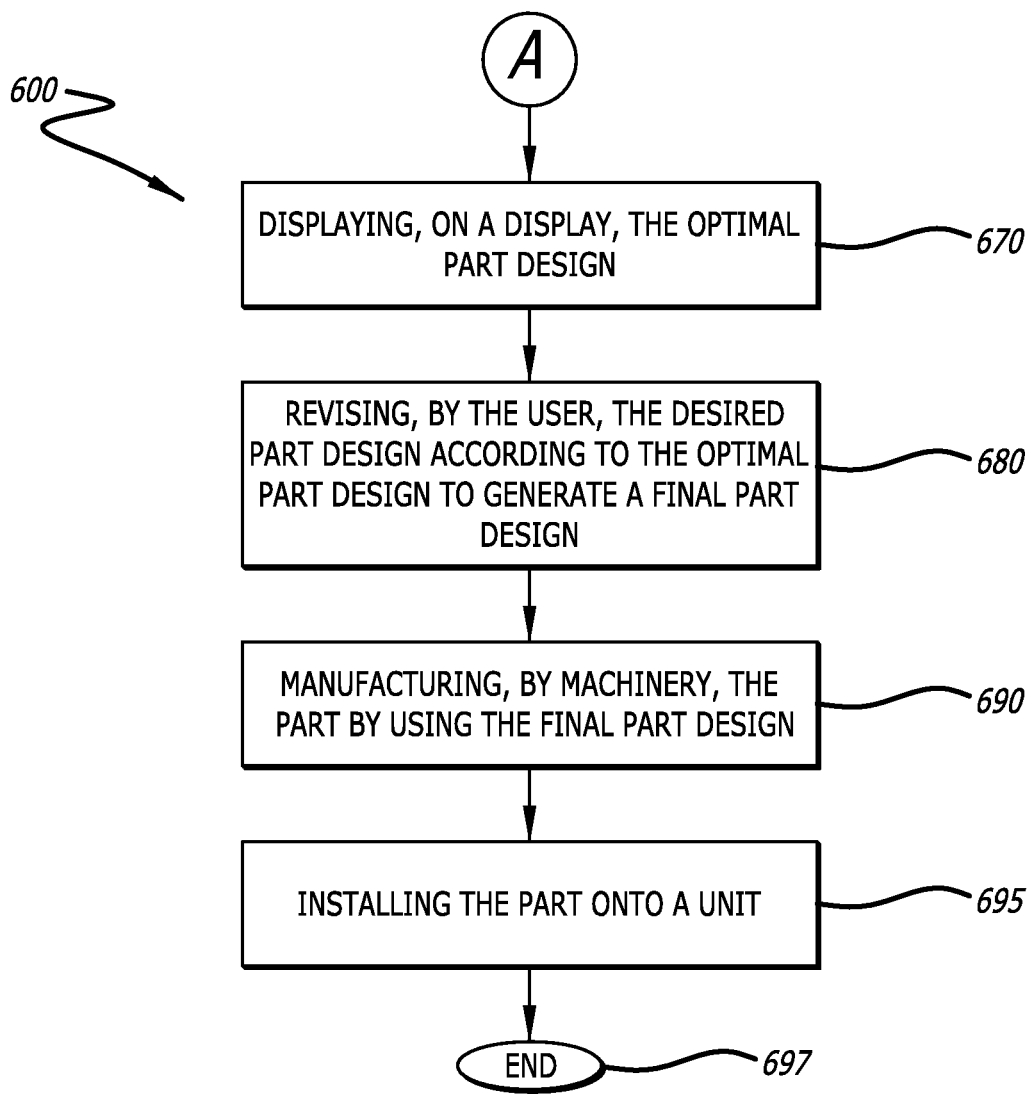

FIGS. 6A and 6B together are a flow chart showing a disclosed method for operating the disclosed artificial intelligence-based manufacturing part design system, in accordance with at least one embodiment of the present disclosure.

FIG. 7 is a diagram showing a user interface on a display of a computer displaying a user's desired part design, an objectives option, a weightings option, and a similarity bounds option for the desired part design, in accordance with at least one embodiment of the present disclosure.

Figure 8:
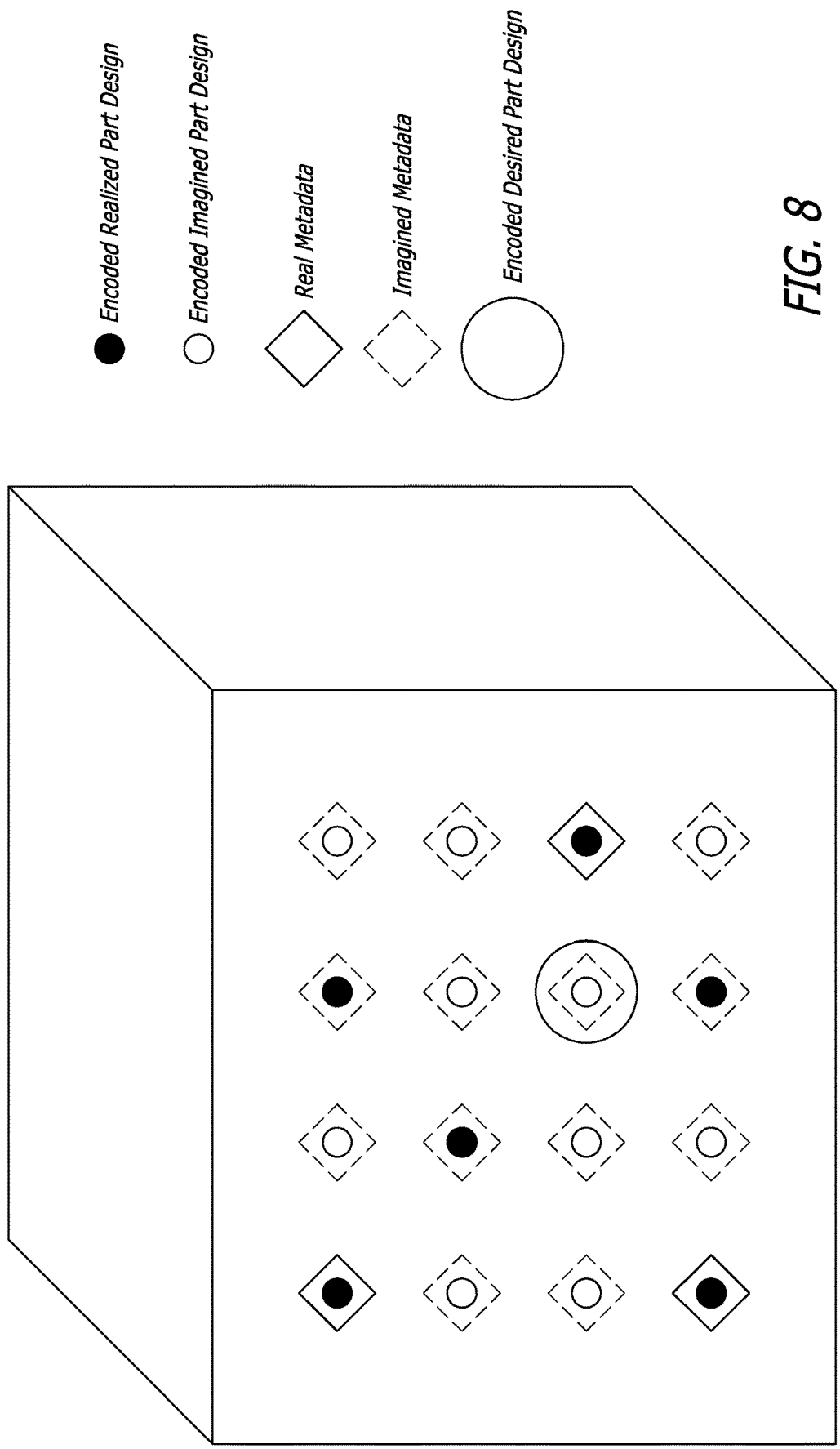

FIG. 8 is a diagram showing an exemplary space comprising encoded realized part designs, encoded imagined part designs, real metadata, and imagined metadata, where the encoded desired part design is identified within the space, in accordance with at least one embodiment of the present disclosure.

FIG. 9 is a diagram showing an exemplary space comprising encoded realized part designs, encoded imagined part designs, real metadata, and imagined metadata, where a group (or region) of encoded part designs that are similar to the encoded desired part design is identified within the space, in accordance with at least one embodiment of the present disclosure.

Figure 10:
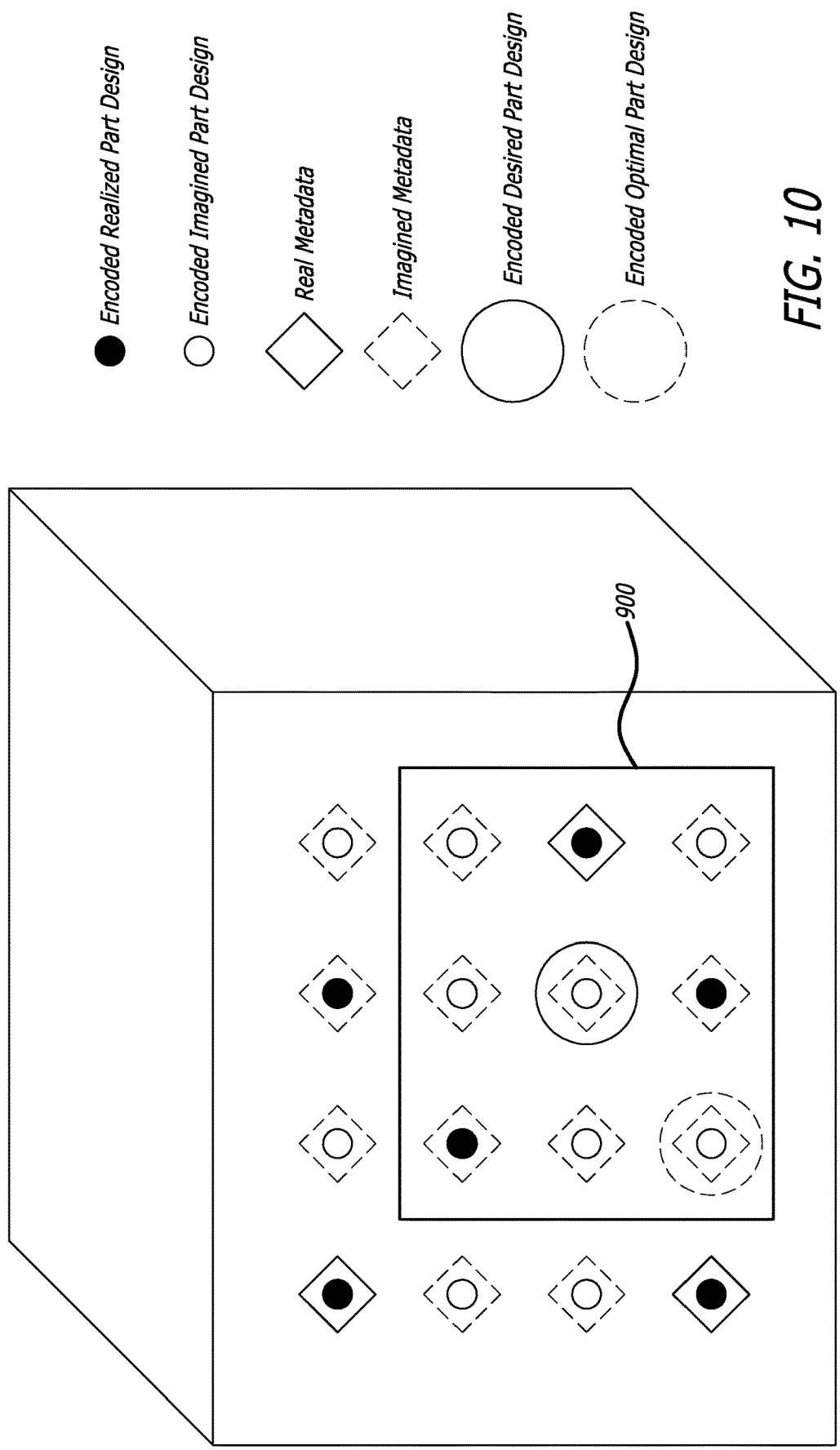

FIG. 10 is a diagram showing an exemplary space comprising encoded realized part designs, encoded imagined part designs, real metadata, and imagined metadata, where an encoded optimal part design is identified within the group (or region) of encoded part designs, in accordance with at least one embodiment of the present disclosure.

Figure 11:
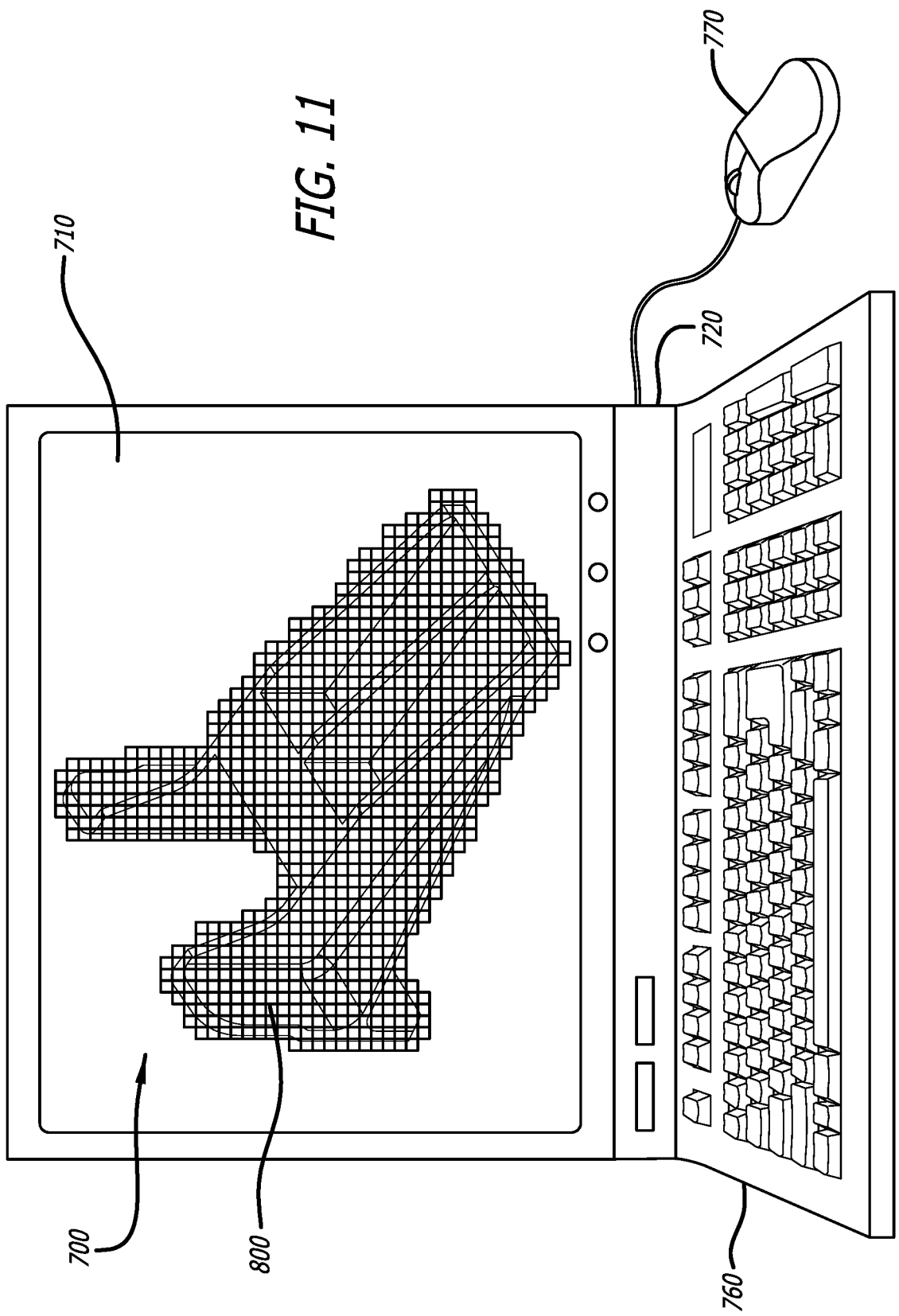

FIG. 11 is a diagram showing a user interface on a display of a computer displaying an optimal part design, in accordance with at least one embodiment of the present disclosure.

Figure 12:
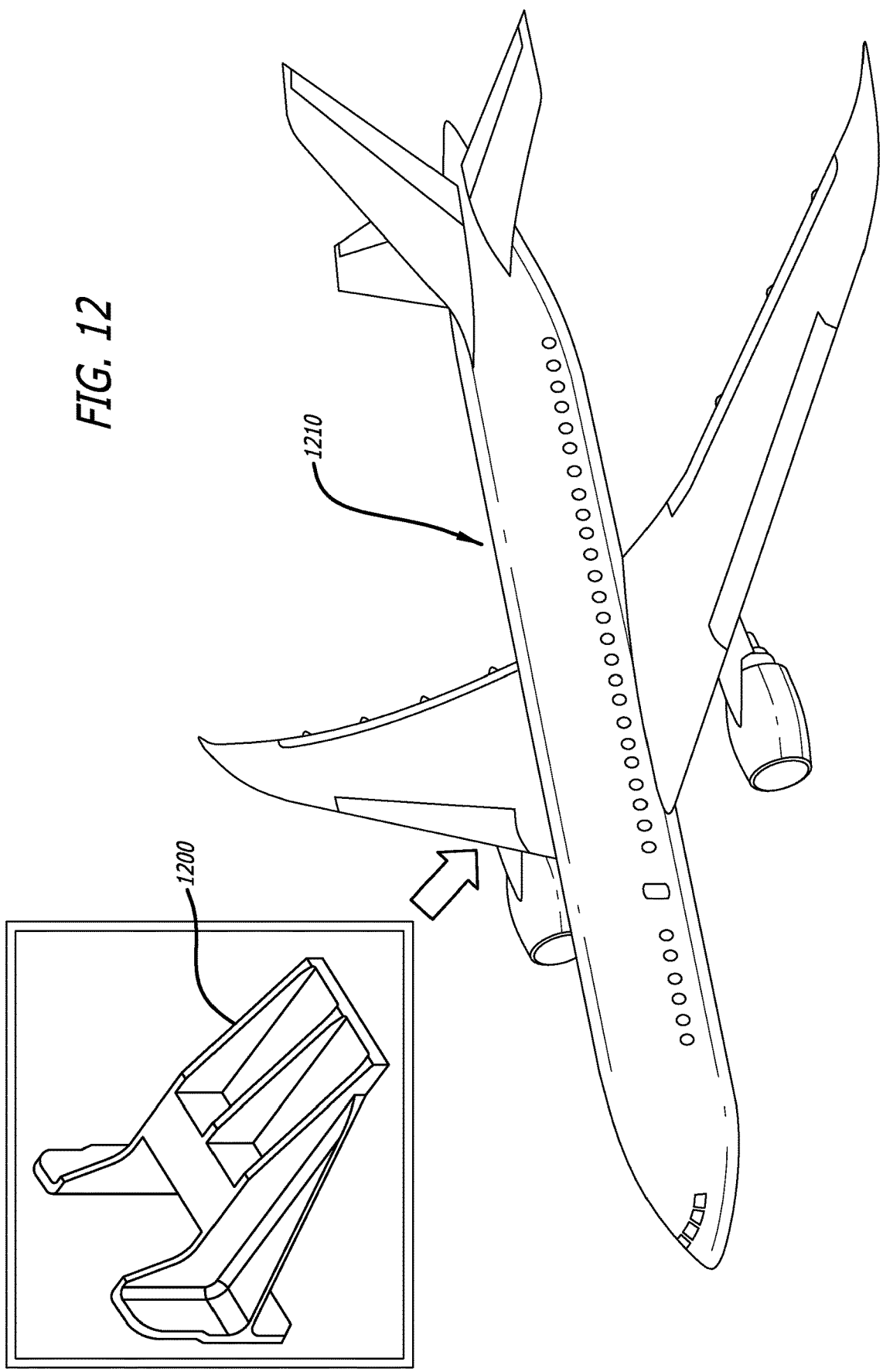

FIG. 12 is a diagram showing a part being installed onto a unit (e.g. an airplane), in accordance with at least one embodiment of the present disclosure.

Figure 13:
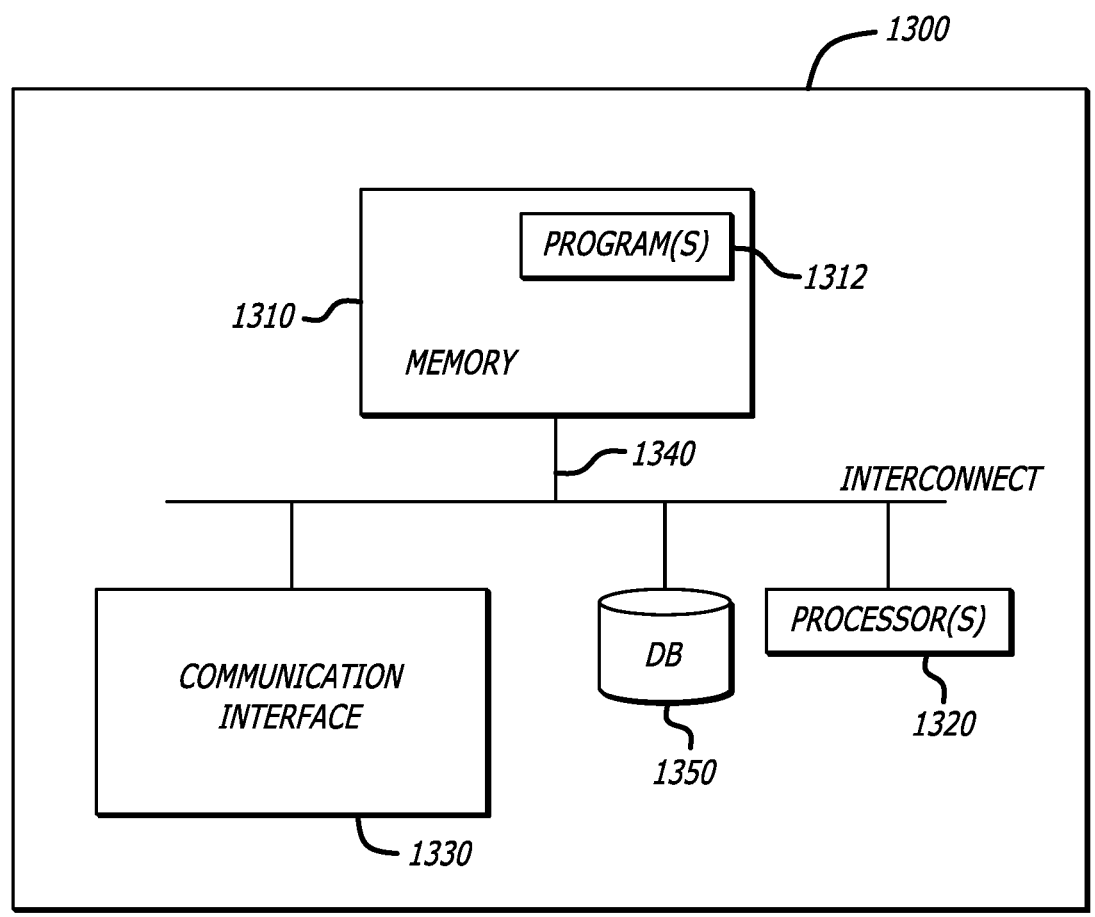

FIG. 13 is a block diagram of components of a computing apparatus or system in which various embodiments may be implemented or that may be utilized to execute embodiments.

DESCRIPTION

The methods and apparatus disclosed herein provide an operative system for artificial intelligence-based manufacturing part design. In one or more embodiments, the system of the present disclosure teaches an approach to providing intelligent artificial intelligence-based design feedback to a human design engineer during the part design process to systematically improve the part design with respect to flexibly-specified design objectives (e.g., cost, weight, manufacturability, size, material, or a combination of objectives), weightings (e.g., an importance weighting for each of the objectives), and similarity bounds (e.g., the search radius of a group (or region) within a space comprising encoded part designs). The system enables design engineers, with the use of artificial intelligence/neural network-based tools, to optimize for specified design objectives to generate a new part design.

During operation of the disclosed system, a design engineer drafts an initial design for a specific part. The design engineer then submits that initial part design (e.g. a computer-aided design (CAD) model of the part) along with specified desired improvement objectives, weightings (e.g., weightings of the objectives), and similarity bounds (e.g., the search radius of the group (or region) within the space) to a neural network processing engine (e.g., a processor(s)) of the system. The neural network processing engine then searches through a continuous artificial intelligence-discovered space of similar parts (comprising both real part designs and imagined part designs) in order to find a suggested optimal design for the part with respect to the specified objectives, weightings, and similarity bounds. Then, the design engineer reviews the suggested part design, and updates the original part design with the suggested part updates accordingly.

The technology employed by the disclosed system is based on a neural network, which is able to learn the distributions describing an entire "space" of mechanical parts by seeing a sufficient number of examples. The examples of parts come from, for example, a corporation's database of parts that engineers have created for current and previous programs (e.g., aircraft programs). There may be millions of part files within the company for the neural network to learn from. The disclosed system employs the use of a neural network architecture called an autoencoder (e.g., one type of autoencoder that may be employed is a three-dimensional (3D) convolutional autoencoder), which can learn an entire space of parts (e.g. an entire landscape of part designs beyond in quantity than just the original part designs that it was trained on) and also learn a parameterization of that space of parts (e.g., a way to explore the space). Furthermore, the neural network architecture provides an "embedding vector", which allows for a metric operating on that space to measure the "similarity" between two parts.

The space's parameterization and the similarity measure can be combined with an objective function (e.g., the objective of minimizing cost or weight, etc.) in order to establish a well-defined optimization problem over a nearby region of the space. This will produce a part within a specified range of nearby parts that optimizes the objective function for that region. Note that the part found within the space will very likely be a part that has never been designed before. The artificial intelligence system will know how to create new parts after having seen enough examples of real parts. Note that also the returned part will just be a sketch in three-dimensions (e.g., a voxelization format or a mesh model). It will be up to the user engineer to accept or reject the new design. And, if the engineer accepts the new design, the engineer will need to manually incorporate the proposed changes into the part design.

In various embodiments, the disclosed system and method are employed for the design of aircraft parts. It should be noted that the disclosed system and method may be used for the design of parts other than aircraft parts as disclosed herein. For example, the disclosed system and method may be used for the design of vehicle parts (e.g., terrestrial vehicle parts, marine vehicle parts, space vehicles, or airborne vehicle parts), the design of structural parts (e.g., building parts, bridge parts, or dam parts), and/or the design of device parts (e.g., machine parts, actuator parts, generator parts, or motor parts). The following discussion is thus directed to aircraft parts without loss of generality.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to part design, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

I. Building a "Space" of Encoded Part Designs for the Disclosed System

The present disclosure teaches an intelligent artificial intelligence-based system that employs a neural network architecture (e.g., an autoencoder) that provides an optimal part design to a user based on the user's initial desired part design and the user's objectives for the desired part design, weightings for the objectives, and similarity bounds. Prior to operation of the system by a user, a space of parts (that comprises both realized part designs and imagined part designs), which is utilized by the system, needs to be built.

Figure 1:
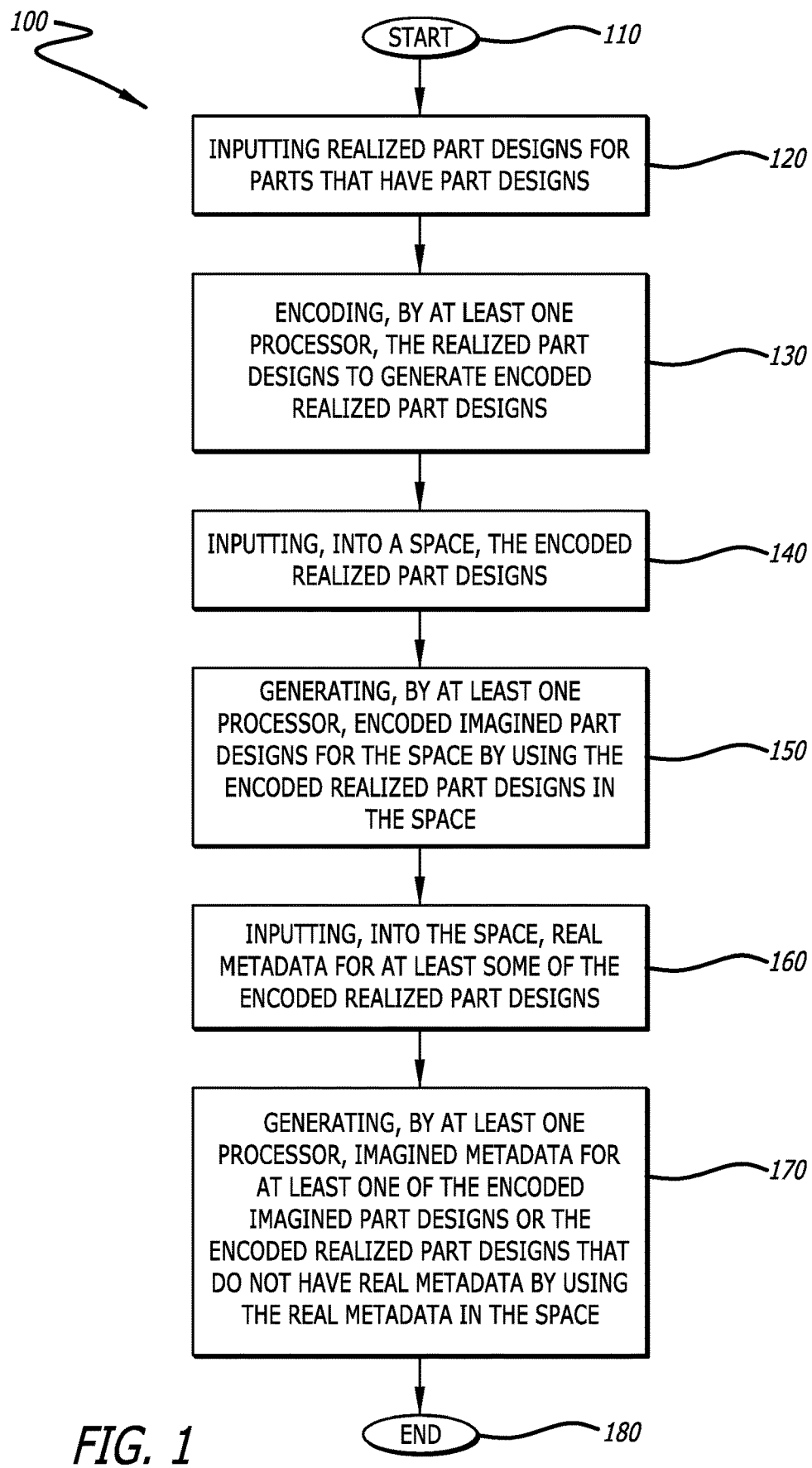
FIG. 1 is a flow chart showing a disclosed method for generating a space of parts for the disclosed artificial intelligence-based manufacturing part design system, in accordance with at least one embodiment of the present disclosure.

FIG. 1 is a flow chart showing a disclosed method 100 for generating a space of parts for the disclosed artificial intelligence-based manufacturing part design system, in accordance with at least one embodiment of the present disclosure. At the start 110 of the method 100, a plurality of realized part designs (e.g., real part designs for parts that have been built or not built), for example in the form of computer-aided design (CAD) models, are inputted into the system (e.g., inputted into memory (refer to 1310 of FIG. 13) and/or a database (DB) (refer to 1350 of FIG. 13)) at 120. Then, at least one processor (refer to 1320 of FIG. 13) encodes the realized part designs to generate encoded realized part designs (e.g., a voxelization format or a mesh model of each of the parts) at 130. For this encoding process, at least one processor (refer to 1320 of FIG. 13) first converts (e.g., voxelizes) each realized part design (e.g., a CAD model) into a voxelization format or mesh model. It should be noted that, in one or more embodiments, the voxelization format may be in a three-dimensional (3D) format or a four-dimensional (4D) format, which will have additional information (e.g., geometric information describing curvature, surface area, etc.) stored the additional dimension. Then, the processor(s) (e.g., an autoencoder, which comprises an encoder followed by a decoder) (refer to 1320 of FIG. 13) uses the voxelization format (or mesh model) to generate an encoded realized part design. It should be noted that the encoding of the voxelization format (or mesh model) to generate an encoded realized part design is an iterative process, which is performed by the processor(s) (e.g., an autoencoder).

Figure 2:
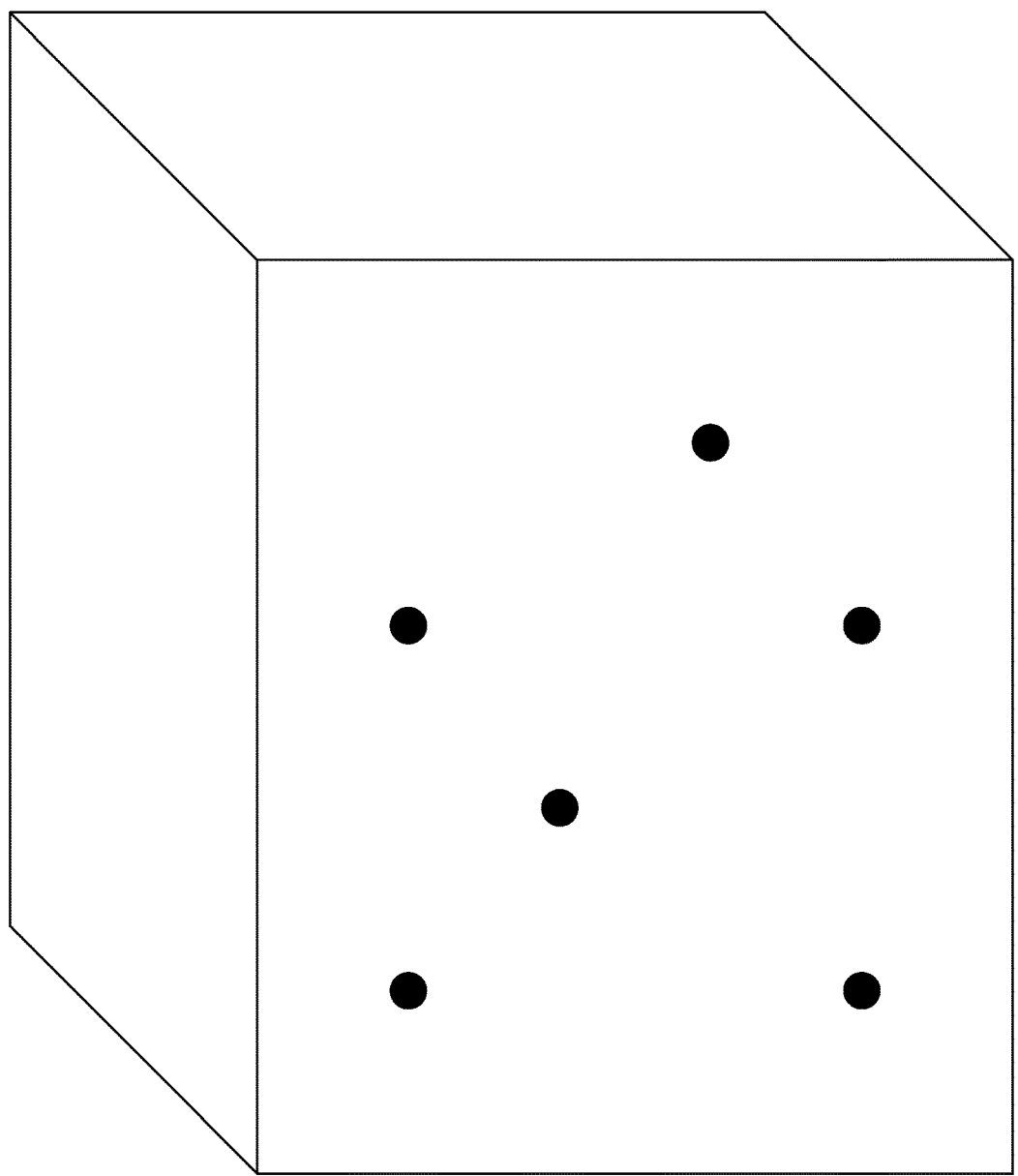
FIG. 2 is a diagram showing an exemplary space comprising encoded realized part designs, in accordance with at least one embodiment of the present disclosure.

The encoded realized part designs are then inputted into a space at 140. Refer to FIG. 2, which is a diagram showing an exemplary space comprising encoded realized part designs, each represented as a filled dot, in accordance with at least one embodiment of the present disclosure. In FIG. 2, the space is a three-dimensional space. It is understood that the space in FIG. 2 comprises a three-dimensional matrix of encoded realized part designs. In other embodiments, the space may comprise less (e.g., a two-dimensional space comprising a two-dimensional matrix of encoded realized part designs) or more dimensions than the three-dimensions as shown in FIG. 2.

Each filled dot shown in the space in FIG. 2 represents the data (e.g., a voxelization format or a mesh model) associated with an individual encoded realized part design. The space may be stored within memory (refer to 1310 of FIG. 13) and/or within at least one database (DB) (refer to 1350 of FIG. 13) of the system.

Figure 3:
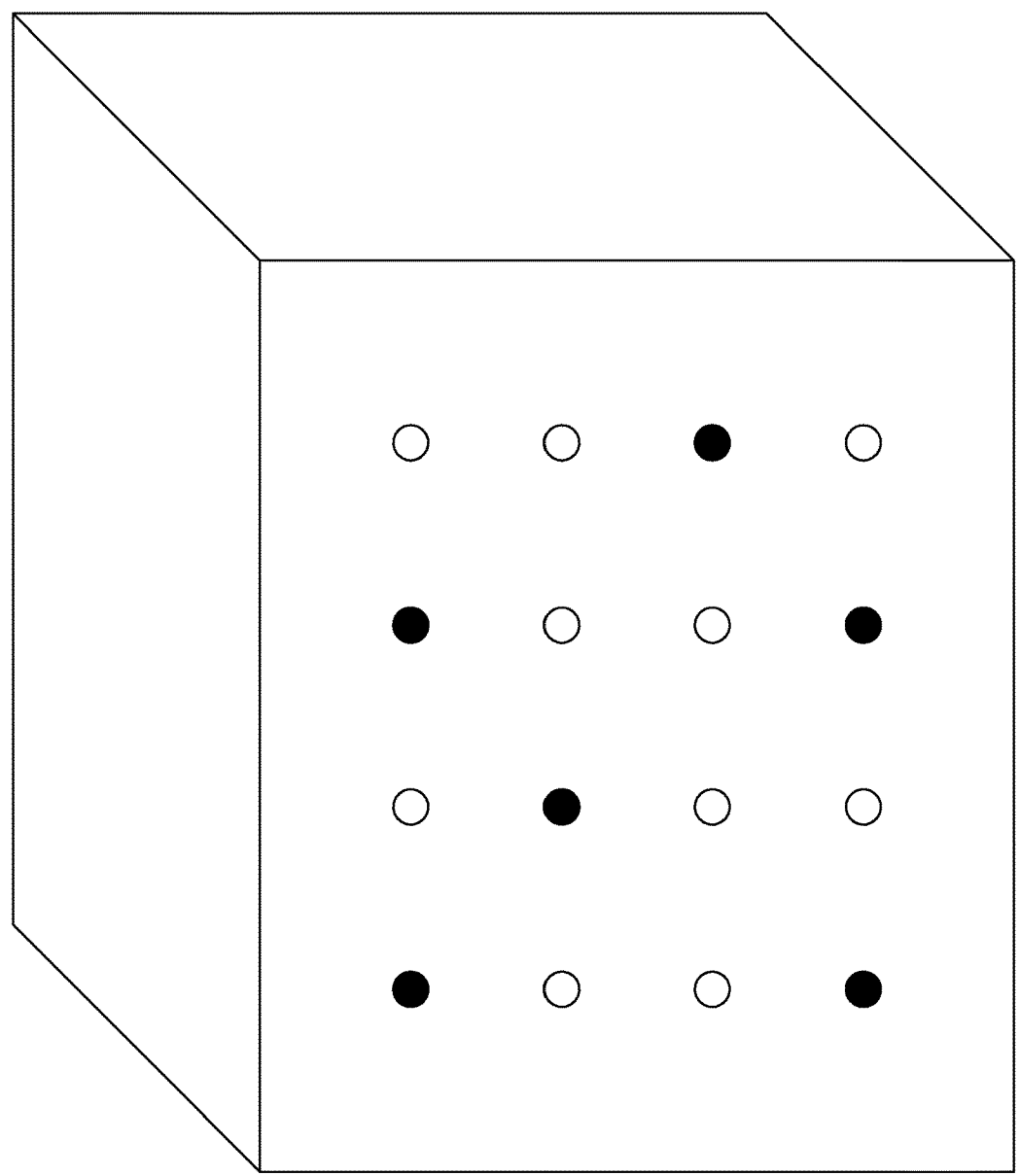
FIG. 3 is a diagram showing an exemplary space comprising encoded realized part designs and encoded imagined part designs, in accordance with at least one embodiment of the present disclosure.

After the encoded realized part designs have been inputted into the space, the neural network (e.g., a machine learning algorithm) (e.g., an autoencoder, such as a three-dimensional (3D) convolutional autoencoder) of the disclosed system trains on the space. In one or more embodiments, the neural network may reside in memory (refer to 1310 of FIG. 13) and/or at least one database (refer to 1350 of FIG. 13) of the system. Once trained, the neural network (e.g., a machine learning algorithm) (e.g., an autoencoder) understands the entire design space of the parts, and is able to generate new parts to fill the entire space with part designs. As such, the neural network then generates encoded imagined part designs for the space (to fill the space with encoded part designs) by using the encoded realized part designs within the space at 150. Refer to FIG. 3, which is a diagram showing an exemplary space comprising encoded realized part designs and encoded imagined part designs, in accordance with at least one embodiment of the present disclosure. In FIG. 3, the space is shown to now comprise both the original encoded realized part designs, shown as filled dots, as well as the newly generated encoded imagined part designs, shown as unfilled dots. It should be noted that the space is now populated with encoded (realized and imagined) part designs.

Figure 4:
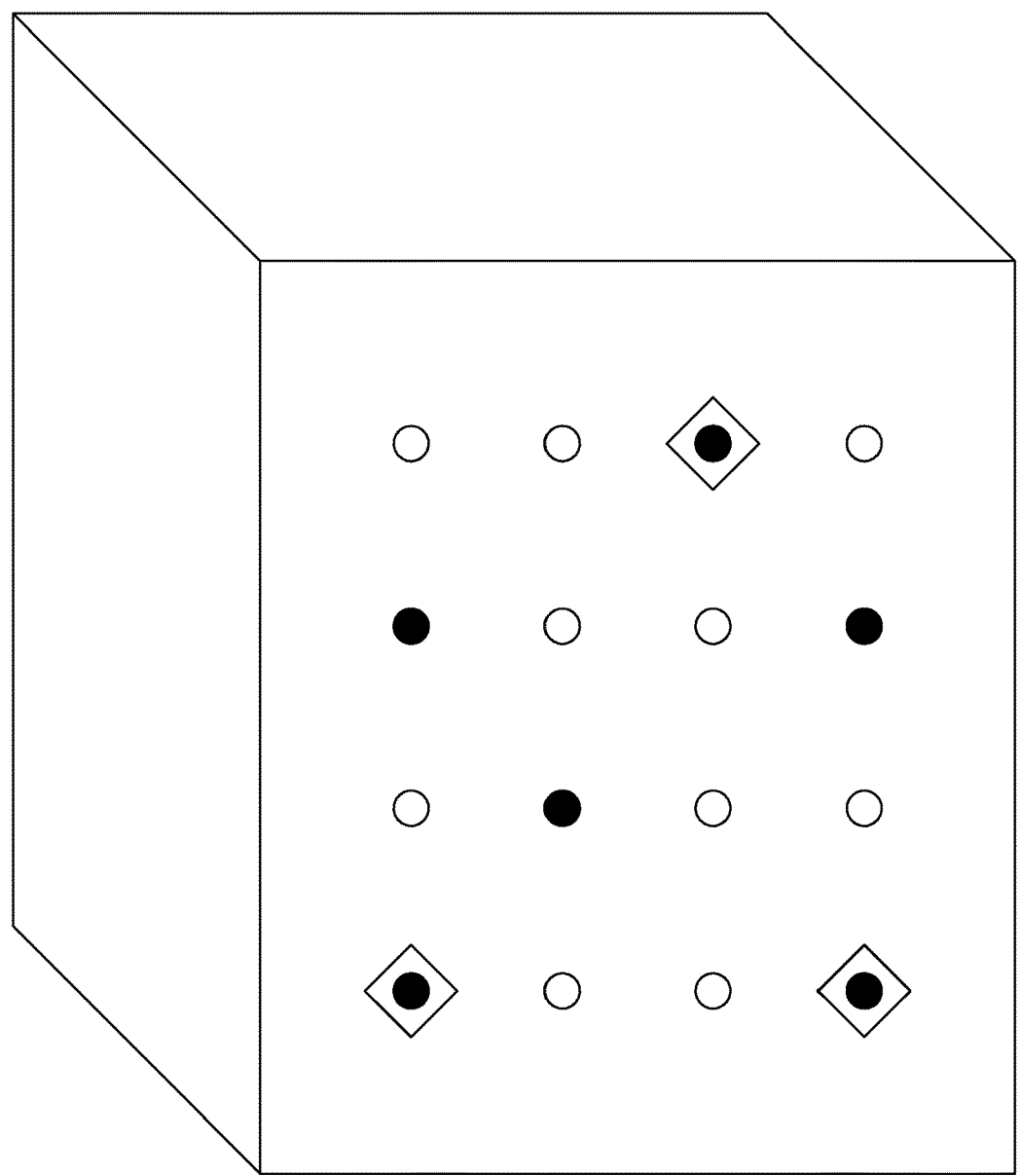
FIG. 4 is a diagram showing an exemplary space comprising encoded realized part designs, encoded imagined part designs, and real metadata, in accordance with at least one embodiment of the present disclosure.

After the space is populated with encoded part designs, real metadata (e.g., metadata such as cost to manufacture the part, manufacturability of the part, structural strength of the part, and/or weight of the part) associated for at least some of the encoded realized part designs is inputted into the space at 160. Real metadata is real known data for the parts associated with the encoded realized part designs. Refer to FIG. 4, which is a diagram showing an exemplary space comprising encoded realized part designs, encoded imagined part designs, and real metadata, in accordance with at least one embodiment of the present disclosure. In FIG. 4, only some of the encoded realized part designs in the space are shown to have associated real metadata. However, in other embodiments, all (or none) of the encoded realized part designs in the space may have associated real metadata.

Figure 5:
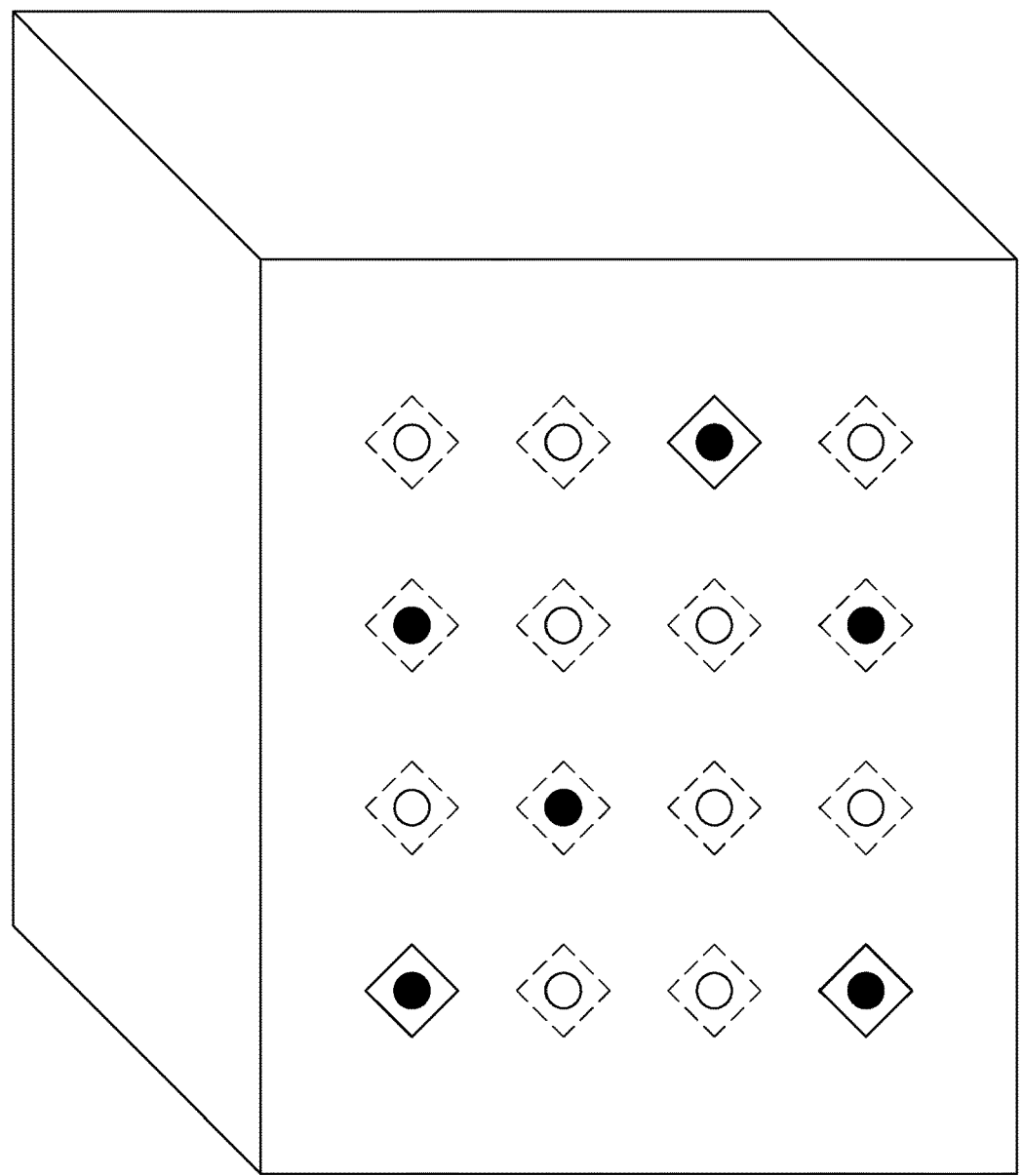
FIG. 5 is a diagram showing an exemplary space comprising encoded realized part designs, encoded imagined part designs, real metadata, and imagined metadata, in accordance with at least one embodiment of the present disclosure.

After the real metadata is inputted into the space, at least one processor, by utilizing regression and classification models or non-statistical methods, generates imagined metadata for at least one of the encoded part designs (e.g., encoded realized part designs and/or encoded imagined part designs) that do not have associated real metadata by using the real metadata within the space at 170. Refer to FIG. 5, which is a diagram showing an exemplary space comprising encoded realized part designs, encoded imagined part designs, real metadata, and imagined metadata, in accordance with at least one embodiment of the present disclosure. In FIG. 5, all of the encoded part designs (e.g., encoded realized part designs and/or encoded imagined part designs) within the space are shown to comprise metadata (e.g., either real metadata or imagined metadata), and the space of encoded part designs is now completely built. After the space is built, the method 100 ends at 180.

II. Operation of the Disclosed System

After the space of encoded part designs is built, the disclosed system may be operated by a user to provide an optimal part design to the user based on the user's initial desired part design and the user's objectives for the desired part design, weightings for the objectives, and similarity bounds. FIGS. 6A and 6B together are a flow chart showing a disclosed method for operating the disclosed artificial intelligence-based manufacturing part design system, in accordance with at least one embodiment of the present disclosure. At the start at 610 of the method 600, a user inputs, via a user interface, a desired part design, objectives for the desired part design, weightings for the objectives, and similarity bounds at 620.

Refer to FIG. 7, which is a diagram showing a user interface (e.g., a graphical user interface (GUI)) 700 on a display 710 of a computer 720 displaying a user's desired part design 730, an objectives option 740, a weightings option 750 for the desired part design 730, and a similarity bounds option 780, in accordance with at least one embodiment of the present disclosure. The user (not shown) has used the user interface 700 to input his desired part design (e.g., a CAD model of the desired part, which has been generated by the user) 730 into the system. An illustration of the desired part design is being displayed by the user interface 700 on the display 710 of the computer 720. The desired part design may be stored within memory (refer to 1310 of FIG. 13) and/or within at least one database (DB) (refer to 1350 of FIG. 13) of the system. The user may operate the user interface 700 via the keyboard 760 and/or the mouse 770 of the computer 720.

The user may want to combine multiple desired design metrics into a single objective incorporating contributions from each design metric. For example, the desired part design may be optimized for one or more design objectives (e.g., a desired minimization of cost to manufacture the part, a desired ease of manufacturability of the part, a desired maximization of structural strength of the part, and/or a desired minimization of weight of the part). The user may do so by designating the desired design objectives via the objectives option 740 of the user interface 700. In addition, the user may specify weightings for the specified design objectives via the weightings option 750 of the user interface 700. For example, for the objectives option 740, the user may use a drop-down menu offered by the objectives option 740 to select for a desired minimization of cost to manufacture the part, a desired maximization of structural strength of the part, and a desired minimization of weight of the part. Then, the user may use the weightings option 750 to specify weightings for each of those objectives. For example, the user may specify, via a drop-down menu from the weightings option 750, the following weightings (which will total 100%) for the selected objectives: minimization of cost to manufacture the part 75%, maximization of structural strength of the part 10%, and a desired minimization of weight of the part 15%. In addition, the user may use a similarity bounds option 780 to specify a similarity bounds (e.g., the search radius of a group (or region) within a space comprising encoded part designs) to be applied. For example, for the similarity bounds option 780, the user may use a drop-down menu offered by the similarity bounds option 780 to select for a desired size of a search radius for a group (or region) within a space comprising encoded part designs (e.g., the size of the radius of the group can be specified by a percentage of area (e.g., 1% area) within the space of encoded part designs).

After the user has inputted the desired part design, objectives for the desired part design, weightings for the objectives, and similarity bounds, at least one processor (refer to 1320 of FIG. 13) encodes the desired part design (e.g., the CAD model) to generate an encoded desired part design (e.g., a voxelization format or a mesh model) at 630. At least one processor (refer to 1320 of FIG. 13) of the system identifies the encoded desired part design (e.g., a voxelization format or a mesh model) within the space of encoded part designs. Refer to FIG. 8, which is a diagram showing an exemplary space comprising encoded realized part designs, encoded imagined part designs, real metadata, and imagined metadata, where the encoded desired part design is identified within the space, in accordance with at least one embodiment of the present disclosure. In FIG. 8, the encoded desired part design is identified as corresponding with an encoded imagined part design within the space.

After the encoded desired part design is generated, at least one processor (refer to 1320 of FIG. 13) identifies a group (or region) 900 (refer to FIG. 9) of part designs within the space that is similar to the desired part design by comparing the encoded desired part design to the encoded realized part designs and the encoded imagined part designs as well as the real metadata and the imagined metadata within the space at 640. The size of the group (e.g., the size of the radius of the designated group area within the space) 900 is determined by the similarity bounds. Refer to FIG. 9, which is a diagram showing an exemplary space comprising encoded realized part designs, encoded imagined part designs, real metadata, and imagined metadata, where a group (or region) 900 of encoded part designs that are similar to the encoded desired part design is identified within the space, in accordance with at least one embodiment of the present disclosure.

After a group (or region) 900 of similar encoded part designs is identified, at least one processor (refer to 1320 of FIG. 13) generates an encoded optimal part design by analyzing the group (or region) 900 of encoded part designs according to the user specified objectives and weightings at 650. In particular, the encoded optimal part design is generated by using the metadata (e.g., real metadata and imagined metadata) of the encoded part designs (e.g., encoded realized part designs and encoded imagined part designs) of the group (or region) 900 to optimize for the user specified objectives and weightings. Refer to FIG. 10, which is a diagram showing an exemplary space comprising encoded realized part designs, encoded imagined part designs, real metadata, and imagined metadata, where an encoded optimal part design is identified within the group (or region) 900 of encoded part designs, in accordance with at least one embodiment of the present disclosure. In FIG. 10, the encoded optimal part design is identified as corresponding with an encoded imagined part design within the space.

After an encoded optimal part design is generated, at least one processor (refer to 1320 of FIG. 13) decodes the encoded optimal part design (e.g., a voxelization format or a mesh model) to generate an optimal part design (e.g., a CAD model) at 660. It should be noted that in other embodiments, at least one processor (refer to 1320 of FIG. 13) may generate more than one optimal part design (e.g., several CAD models) for the user to review.

Then, a display 710 displays the optimal part design 800, at 670. Refer to FIG. 11, which is a diagram showing a user interface 700 on a display 710 of a computer 720 displaying an optimal part design 800, in accordance with at least one embodiment of the present disclosure. In FIG. 8, the optimal part design (e.g., a CAD model) 800 appears pixilated because it was decoded from an encoded optimal part design, which is an imagined part design in the form of a voxelization format or a mesh model.

After the optimal part design (e.g., a CAD model) 800 is displayed on the display 710 to the user, the user, if desired, may manually revise (via a CAD program, which may or may not be accessed via the user interface 700) the original desired part design 730 according to the features of the optimal part design 800 to generate a final part design (e.g., a CAD model) at 680. After the final part design is generated, a part 1200 (refer to FIG. 12) may be manufactured by machinery using the final part design (e.g., a CAD model) at 690. Then, the part 1200 (refer to FIG. 12) may be installed onto (or into) a unit (e.g., a vehicle, such as an airplane) 1210 (refer to FIG. 12) at 695. Refer to FIG. 12, which is a diagram showing a part 1200 being installed onto a unit (e.g. an airplane) 1210, in accordance with at least one embodiment of the present disclosure. It should be noted that the unit may be a vehicle (as is show in FIG. 12), a structure, or a device. After the unit is installed, the method 600 ends at 697.

III. Exemplary System Components

FIG. 13 is a block diagram 1300 of components of a computing apparatus or system in which various embodiments may be implemented or that may be utilized to execute embodiments. FIG. 13 generally illustrates components of a computing device 1300 that may be utilized to execute embodiments and that includes a memory 1310 (e.g., to store the space), a program (e.g., machine learning algorithm, neural network, autoencoder, regression and classification models, and/or non-statistical algorithms) 1312, a processor or controller (e.g., a computer processor) 1320 to execute the program 1312, a database 1350 for storing data (e.g., the space and/or a program(s)), a communication (e.g., network) interface 1330, e.g., for communications with a network or interconnect 1340 between such components (e.g., to connect to the computer 720). The memory 1310 may be or include one or more of cache, RAM, ROM, SRAM, DRAM, RDRAM, EEPROM and other types of volatile or non-volatile memory capable of storing data. The processor unit 1320 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1340 may include a system bus, LDT, PCI, ISA, or other types of buses, and the communications or network interface may, for example, be an Ethernet interface, a Frame Relay interface, or other interface. The communication interface 1330 may be configured to enable a system component to communicate with other system components across a network that may be a wireless or various other networks. It should be noted that one or more components of computing device 1300 may be located remotely and accessed via a network. Accordingly, the system configuration provided in FIG. 13 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1320 executes program instructions 1312 within memory 1310 and/or embodied on the carrier to implement method embodiments. Further, embodiments may reside and/or execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. A method for designing a part, the method comprising:
inputting, by a user into a user interface, a desired part design, objectives for the desired part design, weightings for the objectives, and similarity bounds;
encoding, by at least one processor, the desired part design to generate an encoded desired part design;
identifying, by the at least one processor, a group of part designs within a space, based on the similarity bounds, that is similar to the desired part design by comparing the encoded desired part design to encoded realized part designs, encoded imagined part designs, real metadata, and imagined metadata within the space;
generating, by the at least one processor, an encoded optimal part design by analyzing the group of part designs according to the objectives and the weightings;
decoding, by the at least one processor, the encoded optimal part design to generate an optimal part design; and
displaying, on a display, the optimal part design.

2. The method of claim 1, wherein the method further comprises revising, by the user, the desired part design according to the optimal part design to generate a final part design.

3. The method of claim 2, wherein the method further comprises manufacturing, by machinery, the part by using the final part design.

4. The method of claim 3, wherein the method further comprises installing the part onto a unit.

5. The method of claim 4, wherein the unit is one of a vehicle, a structure, or a device.

6. The method of claim 1, wherein the method further comprises:
inputting realized part designs for parts that have part designs;
encoding, by the at least one processor, the realized part designs to generate the encoded realized part designs;
inputting, into the space, the encoded realized part designs;
generating, by the at least one processor, the encoded imagined part designs for the space by using the encoded realized part designs in the space;
inputting, into the space, the real metadata for at least some of the encoded realized part designs; and
generating, by the at least one processor, the imagined metadata for at least one of the encoded imagined part designs or the encoded realized part designs that do not have real metadata by using the real metadata in the space.

7. The method of claim 6, wherein the at least one processor uses a machine learning algorithm to generate the encoded imagined part designs.

8. The method of claim 7, wherein the machine learning algorithm is an autoencoder.

9. The method of claim 6, wherein the at least one processor uses regression and classification models or non-statistical methods to generate the imagined metadata.

10. The method of claim 1, wherein the objectives for the desired part design are to optimize at least one of cost, structural integrity, manufacturability, or weight.

11. The method of claim 1, wherein the desired part design is a computer aided design (CAD) model design.

12. The method of claim 1, wherein the optimal part design is a CAD model design.

13. A system for designing a part, the system comprising:
a user interface to receive, from a user, a desired part design, objectives for the desired part design, weightings for the objectives, and similarity bounds;
memory to store a space comprising an encoded desired part design, encoded realized part designs, encoded imagined part designs, real metadata, and imagined metadata;
at least one processor configured to encode the desired part design to generate the encoded desired part design, to identify a group of part designs within the space, based on the similarity bounds, that is similar to the desired part design by comparing the encoded desired part design to the encoded realized part designs, the encoded imagined part designs, the real metadata, and the imagined metadata within the space, to generate an encoded optimal part design by analyzing the group of part designs according to the objectives and the weightings, and to decode the encoded optimal part design to generate an optimal part design; and
a display configured to display, to the user, the optimal part design.

14. The system of claim 13, wherein the user interface is further to allow the user to revise the desired part design according to the optimal part design to generate a final part design.

15. The system of claim 14, wherein the system further comprises machinery to manufacture the part by using the final part design.

16. The system of claim 15, wherein the part is configured to be installed onto a unit.

17. The system of claim 16, wherein the unit is one of a vehicle, a structure, or a device.

18. The system of claim 13, wherein the at least one processor is further configured to encode realized part designs to generate the encoded realized part designs for the space, to generate the encoded imagined part designs for the space by using the encoded realized part designs in the space, and to generate the imagined metadata for at least one of the encoded imagined part designs or the encoded realized part designs that do not have the real metadata by using the real metadata for at least some of the encoded realized part designs in the space.

19. The system of claim 18, wherein the at least one processor uses a machine learning algorithm to generate the encoded imagined part designs.

20. The system of claim 19, wherein the machine learning algorithm is an autoencoder.

* * * * *